United States Patent Office 3,233,661
Patented Feb. 8, 1966

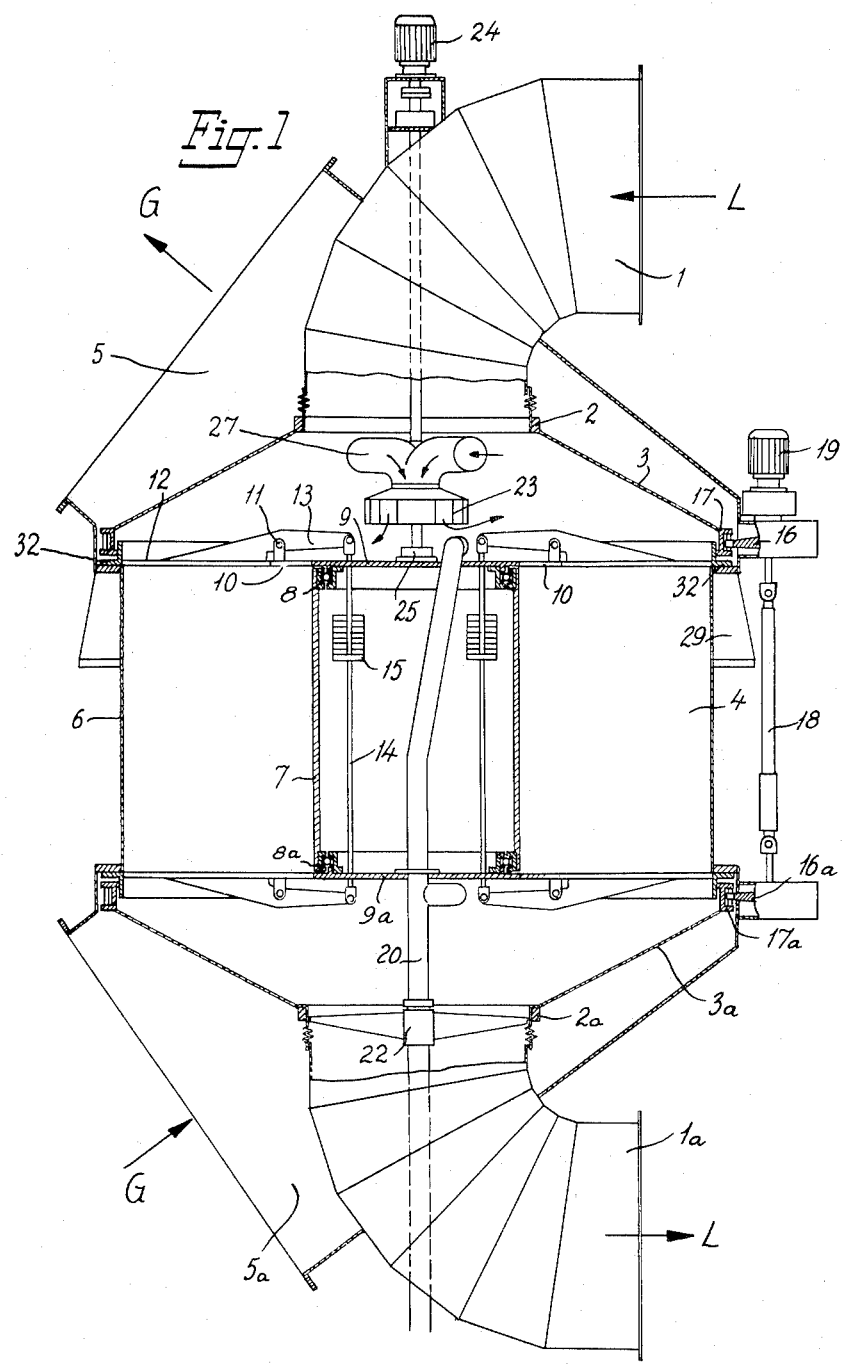

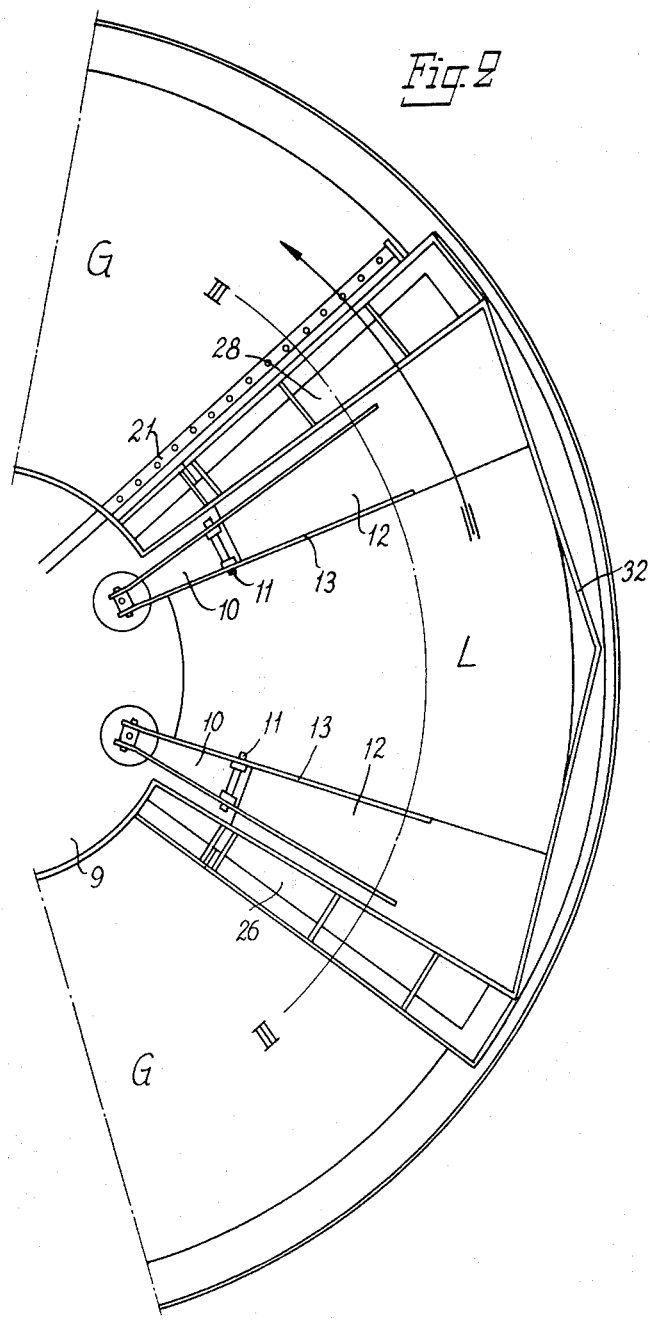

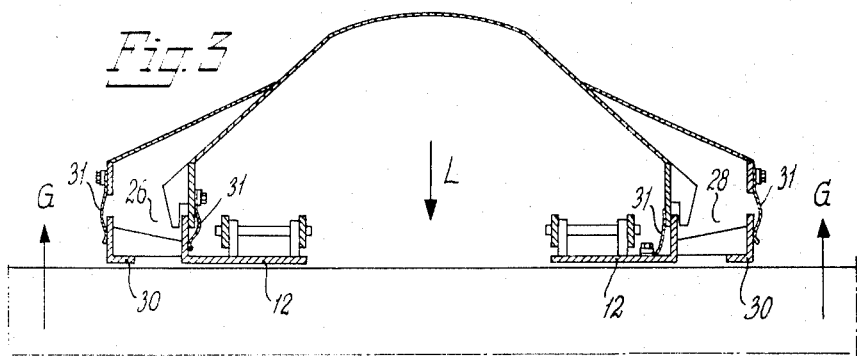
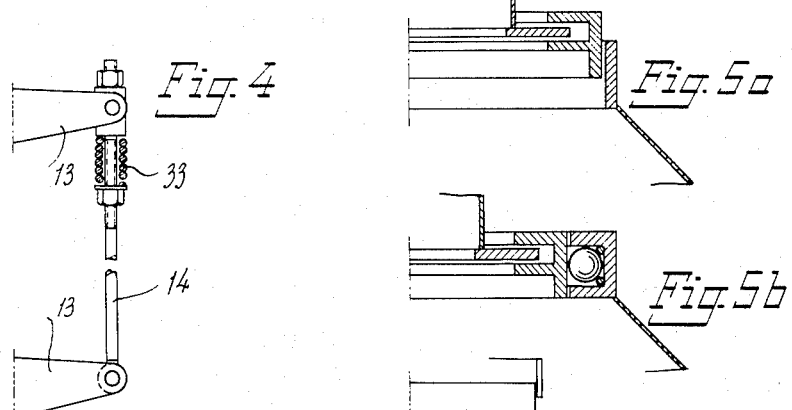
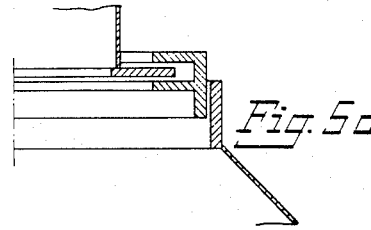
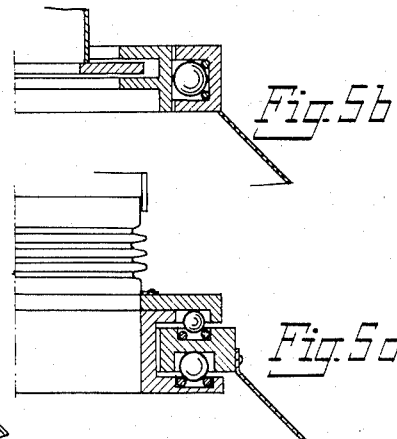
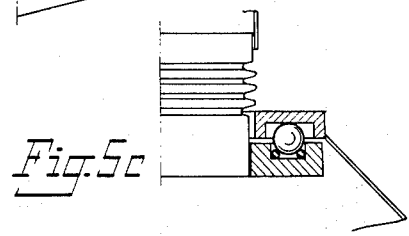
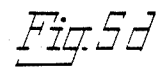
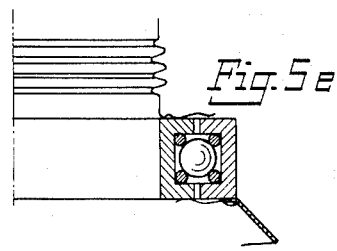
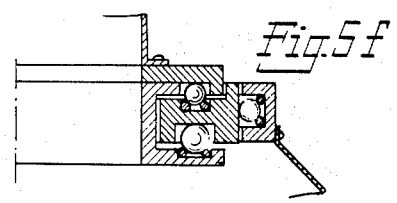

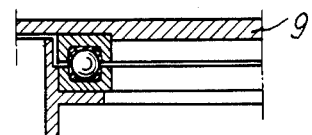
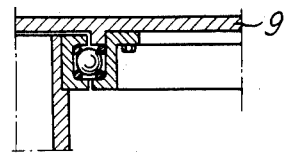
Fig.6a   Fig.6b
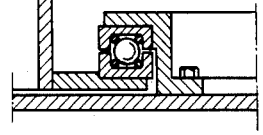
Fig.6c   Fig.6d   Fig.6e
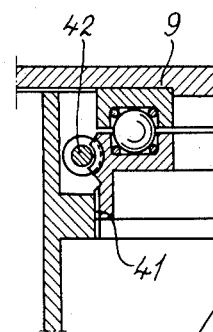
Fig.6f
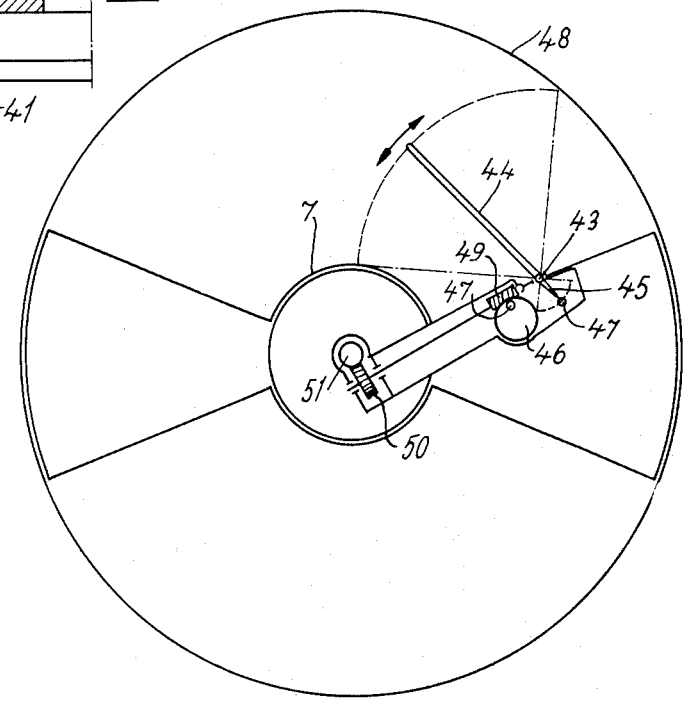
Fig.7

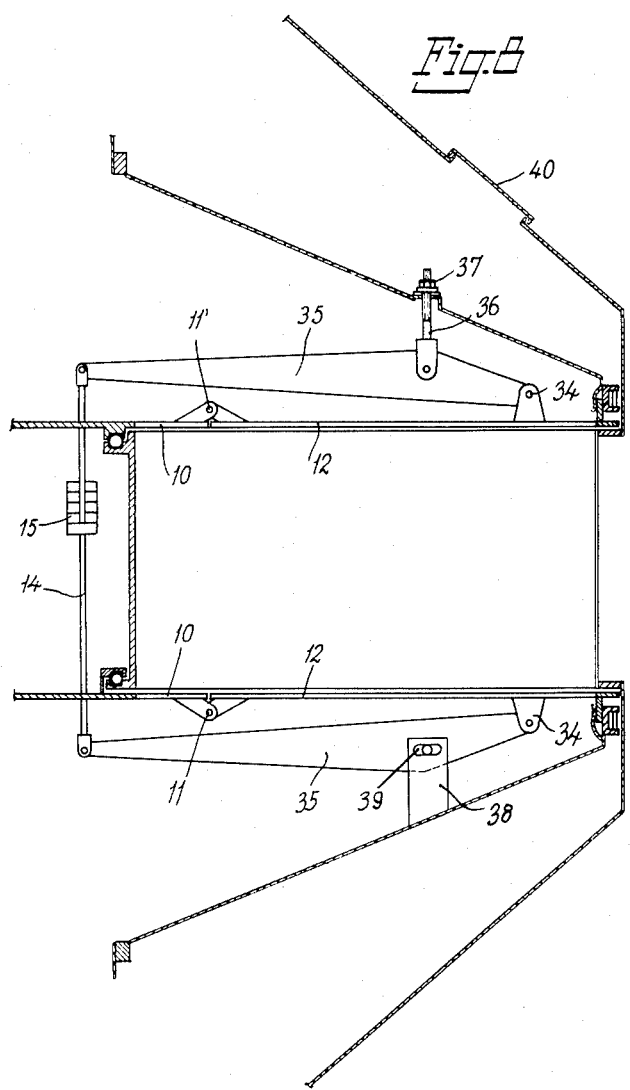

3,233,661
FLUE GAS HEATED REGENERATIVE AIR PREHEATER WITH STATIONARY HEAT RETAINING MASS AND ROTARY AIR CHANNEL VALVES
Werner Firgau and Friedrich Häussler, Heidelberg-Pfaffengrund, Germany, assignors to Svenska Rotor Maskiner Aktiebolag, Stockholm, Sweden
Filed Nov. 16, 1962, Ser. No. 238,835
7 Claims. (Cl. 165—5)

The present invention relates to flue gas heated regenerative heat exchangers for air preheating, having stationary heat retaining mass and rotary air channel valves. More particularly the invention relates to such a heat exchanger in which centrally carried rotary air channel valves are driven from the outside and include walls for separating channels for air and flue gases, respectively, extending freely in outward direction from a central carrying structure for the rotary air channel valves.

Such heat exchangers have hitherto, however, not succeeded in practice due to certain structural defects.

The regenerative heat exchanger according to the invention contemplates an improvement of this type and is characterized substantially by a construction in which the rotary air channel valves at either end of the stationary heat retaining mass are individually carried adjacent to the plane of the confronting end face of the heat retaining mass by annular bearing means providing free internal passageway therethrough and which are carried by a stationary tube axially passing through the heat retaining mass, which tube in the following will be referred to as the "stator tube."

The drawings show by way of example an embodiment of the invention as well as a number of modifications of structural details alternatively utilizable therein.

FIG. 1 shows a vertical section through a regenerative heat exchanger according to the invention.

FIG. 2 shows on a slightly enlarged scale a partial top plan view of the heat exchanger and incorporating a modification thereof.

FIG. 3 shows a development of a vertical section through a part of the heat exchanger taken on the dash-dotted line III—III of FIG. 2 and concentric with the axis of the heat exchanger.

FIG. 4 shows a linkage for connection of two movable sealing plates registering with each other axially.

FIGS. 5a to 5f show different forms of construction of the sealing between the rotary and angularly stationary parts of the air channel.

FIGS. 6a to 6f show different forms of the annular bearing means carried by the central stator tube.

FIG. 7 shows in a stop plan view a soot blower device of different form provided in the heat exchanger.

FIG. 8 shows a different form of construction for supporting the sealing plates.

In the heat exchanger chosen as an example, reference is had to a flue gas operated air preheater having a vertical shaft and to which, as is particularly evident from FIG. 1, combustion air L to be heated is admitted horizontally from above through an elbow 1 and therefrom passes through a rotary connection 2 into a rotary air valve 3.

While in a rotor carrying the heat retaining mass the end surface of the rotor is in the ordinary manner divided into a single flue gas channel and a single air channel, in the present example a construction is chosen in which the air is bifurcated so that within the stationary channels two air streams flow in one direction in the one channel and two parallel streams flow in opposite direction in the other channel.

In accordance therewith the air from the cold air elbow 1 enters the upper rotary bifurcated air valve 3 which is connected therewith by the rotary connection 2 and passes through the heat retaining mass 4 from above downwardly, whereafter the air enters the lower rotary bifurcated air valve 3a which by means of a rotary connection is connected with a hot air discharge elbow 1a.

In counter-direction to the stream of air the flue gas G is admitted to the preheater from below through an obliquely provided duct connection 5a which extends over the complete lower annular end face of the heat retaining mass 4. The flue gas passes then in a direction from below upwardly through the portion of the heat retaining mass 4 which is uncovered by the bifurcated air valves 3 and 3a and passes out upwardly through the outlet duct 5 of the flue gas.

In the centre of the stator 6 carrying the heat retaining mass 4 the stator tube 7 referred to above is provided, which passes through the heat retaining mass and in certain respects can be regarded as a large hub for the stator. At its top and bottom said stator tube is provided with annular bearings 8 and 8a, respectively, which serve as supporting means for the rotary upper and lower portions of the heat exchanger. Said bearing means absorb the vertically acting weight forces of the rotary air valves and serve further as guiding means for said valves. The rotary parts of the annular bearing means are fastened to plates 9 and 9a which also form a portion of the rotary air valves and cover the stator tube 7 at each end edge thereof. Important in this respect is also that the annular bearing means 8 and 8a provide for a free central passageway through the tube 7 that is not closed by firm, that is to say stationary, end closures. As will be further described below it will thus be possible to provide elements in said free central space of the stationary hub which cooperate with the rotary air valves and rotate together with them.

The sealing means are attached to the rotating plates 9 which serve to seal the edges of the rotating walls, separating the air channels from the external gas space, in relation to the end faces of the heat retaining mass. Since the embodiment illustrated is provided with two such air channels, a total of four sealing means are provided on the plate 9 and they extend outwardly in radial direction from the plate 9. In FIG. 2 only one half of the heat retaining mass is shown with one of the air channels L and adjacent parts of both the gas channels G, and further one of said radial sealing means and the elements belonging thereto is visible on either side of this air channel L.

Each of said radial sealing means consists of a section 10 which is firmly attached to the central plate 9 and in radial outward direction connected with a swinging section 12 hinged on an arm 11. Said sealing plates 10, 12 serve the same purpose as the sector shaped sealing plates common in air preheaters with rotating heat retaining mass.

For supporting the hinged sealing plate section 12 a two-armed lever 13 is provided to the outer arm of which the plate 12 is attached, while the inner arm is connected by a rod 14 with the axially registering sealing arrangement at the other end of the heat retaining mass. The excess weight of both the hinged plate sections 12 is balanced by a counter-weight 15 so that the complete swinging arrangement is in approximate equilibrium.

By means of the disclosed construction a satisfactory adjustment of the sealings at the stator end surfaces is secured under all operation conditions. Since the annular bearings 8 and 8a are provided independently of each other just adjacent to the level of the end surfaces of the stator, that is to say in this case are attached adjacent to the ends of the stator tube 7, the result is that the distance between the bearings closely follows the thermal longitudinal changes of the stator tube, that is to say the thermal changes of the height of the stator 6. The sections 10 of the radial sealings firmly attached to the supported plates 9 and 9a, respectively, maintain in this way always the same distance from the end surfaces of the stator whether the latter is cold or hot. However, as regards dishings of the stator, both the hinged sections 12 of the radial seals located one above the other are always synchronously moved and in this way take their position in accordance with said deformations.

This complete sealing device comprising the details 10 to 15 revolves together with the rotary air connections. The driving of said air connections is effected from the outside by means of two interconnected driving gears 16 and 16a engaging corresponding pin racks 17 and 17a of the rotary air connections. In order to accommodate itself to the thermal changes in length the shaft connecting both the gears is formed as a longitudinally movable linkage rod 18. The driving is effected by means of the motor 19 which may consist of an electromotor with gearing, a hydraulic motor or the like. It may also be noted that it is not necessary to provide the upper as well as the lower rotating part with an individual outer driving rack. It will be sufficient to provide such a drive only for one of the two rotating parts, the other being connected therewith in the hollow space of the stator tube 7 to cause it to be driven simultaneously due to the rigid connection.

In order to clean the heat retaining mass 4 soiled by fly dust a central soot blower pipe 20 is provided which rotates together with the rotary air valve and is provided with a branch blower pipe 21. As particularly shown in FIG. 2 said blower pipe is provided with a row of spaced nozzles. The connection between the revolving portion of the soot blower and the stationary portion thereof serving as supply means for soot blowing medium to the soot blower device is effected by means of a stuffing-box 22 which for reasons of strength also is carried by the stationary portion of the air connection, viz. the exit elbow 1a.

In order to draw off the air content from the individual regenerative mass compartments which air due to the rotation of the air valves is sluiced over to the flue gas side, an air fan 23 is provided which is driven by an electromotor 24, and the shaft of the fan is supported by a bearing 25 upon the slowly rotating plate 9. The compartment content which is carried over enters as shown in FIG. 2 along the edge of the radial sealing plate 12, shown in the lower part of said figure, into a suction chamber 26 and is drawn off therefrom through the suction pipe 27 of the fan. Said air can be introduced—as shown in FIG. 1—without necessitating any particular ventilator casing directly into the air present in the rotary air valve. The air drawn off may also as shown in FIG. 2 be brought back into a corresponding or injection chamber 28 from where it is forced into the compartment of heat retaining mass just leaving the flue gas stream. In such a case the ventilator wheel has to be enclosed in a spiral casing so that the air of negative pressure is prevented to enter into communication with the combustion air to be preheated which is under positive pressure.

The direction of rotation of the revolving parts assumed in the foregoing disclosure, that is to say of the plate 9 together with the sealing means attached thereto and the recirculation chambers of the drawn off air is as indicated by an arrow in counter-clockwise direction. As FIG. 1 shows the total weight of the air preheater is supported upon standards 29 which transmit this weight to the foundation.

FIG. 3 shows a section taken circumferentially through and concentric with the air channel of FIG. 2 on the dash-dotted line III—III. It is clearly seen from this figure that in front of the radial sealing plates 10 and 12 angle bars 30 extend which to the left separate the suction chamber 26 for the air drawn off and to the right the injection chamber 28 for such air to be forced back. The sections 12 of the radial sealings, which swing in vertical direction relative the rotary air valve, are sealed against said rotary air valve by a sliding or yielding connection and flexible plate strips 31 may serve this purpose. These spring strips may be provided in different manners. On the left side of FIG. 3 the spring strip 31 is attached to the rotary air valve and on the right side instead to the sealing plate 12 which moves up and down. As regards the flexible strip 31 for sealing the angle bars 30 relative to the rotary air connection the same is applicable.

The flexible strips 31 for sealing between the movable sections 13 of the radial sealings and the rotary air valve continue also along the arcuate circumference of the rotary air valve. The vertical flange of the sealing angle bar 32 is as shown in FIG. 2 formed to extend straight in order that the flexible strip forced against this flange can be straight and due to that, also bear flexibly thereagainst. If the angle bar 32 sealing along the circumference should be arcuate, the sealing flexible strip would be too rigid and could not be gas tightly flexible.

In order to compensate for unforeseen flexing of the stator plane during operation, the movable sections 12 of the radial sealings are yieldingly arranged. Thus the danger is eliminated that the rotary air valve may bind. As is shown in FIG. 4 for this purpose a connection rod 14 is provided between the levers 13 carrying the movable sections 12 and is yieldingly constructed by interconnection of a spring 33.

FIGS. 5a–5f show different possible constructions according to the invention of the rotary air valves 2 and 2a, which are intended to comply with the following requirements. The rotary air valve has to afford smallest possible frictional resistance against the revolving movement of the rotating part relative the stationary connection elbows 1 and 1a, respectively. Furthermore, the rotary connection must be as gas-tight as possible, so that the air stream and the flue gas stream are well separated from each other. Finally the rotary connection must permit movement in limited degree in axial as well as in radial direction, since such movement must be taken into account because of differential heating or due to lack of precision in manufacture.

FIG. 5a shows a simple form of such a rotary air valve in which all the required movements may be effected with sliding friction.

According to FIG. 5b the rotational and the axial movements are made possible by means of a wire ball bearing, in which the clearance between the stationary and the revolving annular members can be kept very small. Due to the low number of revolutions no lubrication is necessary.

FIG. 5c shows another design of the rotary air valve also based on the use of a wire ball bearing. Here the wire ball bearing takes over the rotational as well as the radial movements, while the possibility of axial movement is created by means of an interconnected thin walled folded bellows sleeve. However, pre-requisite condition here is that the folded bellows sleeve is under a tensile prestress so that the upper turntable member of the wire ball bearing is prevented from lifting off.

In the construction according to FIG. 5d such a tensile prestress is not necessary, since in this case the forces are taken care of in both the vertical directions by means of two wire ball bearings located one above the other. Also here the wire ball bearings take care of the radial movements.

In the construction according to FIG. 5e, in which also the forces in both the vertical directions are taken care of, only a single wire ball bearing is necessary. The possibility of radial movement is here less, however, since this movement must be taken up by a folded bellows sleeve rigid per se which further takes over the axial adjustment functions. In this example, furthermore, an additional sealing of the clearance between the stationary and the revolving turntable rings is necessary, even if said clearance is very narrow. For this sealing, flexible plate cuffs are necessary, which are attached to one of the bearing halves and slidingly contacting the other bearing half turntable in relation thereto.

The embodiment shown in FIG. 5f can be regarded as a combination of those according to FIGS. 5b and 5d. Here a folded bellows sleeve is not necessary as an expansion compensator, since the axial movements also are taken over by this wire ball bearing arrangement.

FIGS. 6a–6f show different forms of the bearing of the rotary air valve on the central stator tube 7. Thus reference is here had to the bearings 8 and 8a in FIG. 1.

In the example of construction according to FIG. 6a the revolving bearing portion is located vertically above the stationary bearing portion and is forced against the running race by means of the weight of the rotary air valve. Such a bearing, however, may not be utilizable if forces are exerted in the axially upward direction caused for instance by air pressure or by readjusting forces from the folded bellows sleeve or expansion compensator described above, since in such a case a bearing of this type would be lifted off.

Such a danger does not exist with a bearing according to FIG. 6b. Furthermore, dust that easily can enter the bearing race may also here simply exit downwardly.

Since the interior portion of the stator tube is in communication with the air stream, which due to its higher pressure is liable to pass over through the movement clearance in the bearing into the flue gas stream under negative pressure, the width of said clearance must be reduced to a minimum. This implies, however, no difficulty since the annular members of the bearing are mechanically machined. The reliability of the sealing, however, may always be improved by means of different expedients.

Thus FIG. 6c shows an angular projection lip, which is weared off against the stationary bearing ring until it just is contacting the latter.

Labyrinth forms may also be provided, such as already known and of which the left hand side of FIG. 6d gives an example. However, as the right hand side of the same FIG. 6d shows a flexible sealing may be arranged in one of the rings to slide upon the other ring. For this purpose sealings of elastic, sliding materials may be contemplated. As known examples only may be mentioned graphite, silicone-rubber, and further the organic fluorine compound polytetra-fluorine-ethylene, recently made public, a plastic of waxy or horny appearance.

In the embodiment according to FIG. 6e the running clearance is slidingly sealed by means of a thin plate bandage.

All these forms of sealings make it possible to fill the interior of the bearing with grease, since escape of the grease and entrance of dust are prevented in such forms of construction. To prevent an escape of the grease or too high heating of the same at the existing temperature conditions it may be suitable to cool the bearing ring attached to the stator tube 7 or the bearing ring supported thereon, which is most exposed to the convected heat. This may be accomplished by welding an annularly bent tube having good heat conducting properties and preferably also fluid cooled, either along this bearing ring or along the supporting surface for this bearing ring located at the stator tube 7.

Since the upper bearing member is fastened to the rotating plate 9, which carries the radial sealing plates 10 and 12, and since under certain conditions the necessity remains to readjust the height of said sealing elements during operation, FIG. 6f shows a solution which makes such adjustment according to further modifications of the invention possible in simple manner. The lower bearing member is here threaded in part so that by turning of the lower bearing member the height of the lower member is adjusted. Said relative turning is carried out in the illustrated example in such a way that the rest of the lower annular bearing member is formed as a worm wheel engaged by a worm 42. Said worm in the direction of the tangent to the lower annular bearing member is extended outwardly to form a spindle, which during operation is easily accessible from the outside.

FIG. 7 shows in a simplified manner a modified form of a soot blower including its driving mechanism. This provides an oscillating soot blower which relates the type with a plurality of nozzles as disclosed in FIGS. 1 and 2 has the advantage of consuming less steam or air during the blowing, but on the other hand owing to the use of a single nozzle produces a much more intensive jet. The supply of the steam or air is effected centrally through the preheater via an interconnected stuffing box, which provides for the transition from the stationary part to the rotating part. The air blower conduit enters into the point of oscillation 43 of the oscillating arm or blower pipe 44 and more precisely also via a stuffing box. From the inner end of this arm 44 a lever 45 extends, the outer end of which is eccentrically engaged by a worm wheel 46 over a connecting rod 47 to be swept over the heat retaining mass. The dimensions of the lever 45, the connecting rod 47 and the worm wheel 46 are so chosen, that the end point of the blower pipe 44, where the oscillating nozzle opening is located, can sweep over the space between the shell 48 of the stator and the hub or stator tube 7. The worm wheel 46 is mounted on the rotary air valve and driven by a worm 49, which is fixed at the outer end of a shaft carried on the valve and at the inner end of the shaft a further worm wheel 50 is fixed. This latter worm wheel 50 is engaged by a stationary worm 51 which is attached to the central stationary portion of the preheater, while the rest of the driving mechanism and its bearing is fastened to the rotary air valve and rotates around the worm 51 so as to be brought into operation. On account of that the soot blower pipe 44 is constantly in back and forth movement when the air valves rotate. If blowing is to be performed it is sufficient to open the inlet of the steam or pressure air for the blower.

On account of that, the nozzle describes on account of that successive Archimedean spirals from the inside outwardly, alternating with movements from the outside inwardly. By proper choice of the dimensions of the operating parts the radius vector of said spirals is so determined that it corresponds to the width of the jet in the proximity of the stator shell and the hub, where due to the lower velocity of the flue gases and lower gas temperatures thereof an increased risk of soiling is to be feared so that a more intensive soot blowing is desired. This desire has been taken in consideration in that the radius vector of the spiral in these zones in smaller than in the middle of the range of oscillation of the soot blower. This is positively effected in that the connecting rod 47 at the beginning and the end of an oscillation passes through the range of the dead point and on account of that produces a smaller velocity of oscillation.

In corresponding manner as has been described above in connection with the soot blower the air ventilator can be driven by means of a gear train by the rotating movement of the air valves so that a separate electric motor is not necessary.

FIG. 8 discloses an advantageous support of the revolving sealing plates 12 forming a modification of the first example shown above. Said plates 12 are here connected by links 11' with the stationary sectors 10. The movable plates 12 include, however, at the oscillating end thereof, a further link 34 and in engagement with this is a two-armed lever 35. On the cold side (the upper side in the drawing) is the fulcrum of this lever 35 held by means of a spindle 36 and a nut 37, so that at the cold air valve the height can be adjusted as desired. The end of the other lever arm is by means of a connection rod 14 fastened to the corresponding lever arm of the opposite hot side. Said connection rod 14, however, needs not be yieldable. The necessary yielding is in this example of construction obtained rather by the fact that the fulcrum of the lever 35 positioned on the cold air side is not only adjustable in height but the adjustment nut 37 can be raised together with the spindle 36 upwardly from its support, if the distance of the movable plates 12 from the heat retaining mass has been adjusted too narrowly. The fulcrum 38 of the lever 35 positioned on the other side and thus located in the hot air valve needs not be adjusted as to height but can and must be rigidly connected to the hot air valve by means of a support 38 in order to avoid instability. The fulcrum in any case must be movable to a certain extent in horizontal direction in order to guarantee faultless kinematics during the combined action of the separate movements of the levers. For this purpose the support 38 is provided with a horizontal slot 39 for a guiding pin of the lever 35.

Said device is advantageous in that the position of the plates can be readjusted during operation. For this purpose the valve wing to be readjusted of the rotary air valve means is brought under the manhole 40. The drive then is released for a short while, the cover of the manhole 40 is removed and the desired height adjustment is made by means of the nut 37. Since the flue gases below the cover 40 remain under negative pressure they cannot enter into the ambient space, but rather, cold ambient air will be sucked in, so that the work with the nut 37 may be performed without obstacle.

Beside the advantage of easy accessability to the adjustment means still a further advantage is associated with this construction of the lever in that, due to a more favourable lever multiplication, a comparatively small balancing weight 15 is required. On account of that the total body weight, by means of this new construction according to FIG. 8, may be reduced in comparison with that of the first described embodiment.

As regards the different bearing means, particularly those according to FIGS. 5 and 6, it is to be noted that the design as wire ball bearings only represents an example. Instead of that, such ball bearings may be utilized in which the races are not composed of wires but of other elements. Also roller bearings of other construction may be contemplated.

What is claimed is:

1. A regenerative heat exchanger for preheating a stream of air by means of a stream of flue gas, said heat exchanger comprising a stationary heat retaining mass having passages for the flow of air and gas therethrough in counter current relationship, a gas inlet hood on one side of said mass and a gas outlet hood on the other side of said mass, a rotatable air inlet casing disposed within said gas outlet hood, a rotatable air outlet casing disposed within said gas inlet hood, a central stator tube fixed to said mass and extending therethrough, a disk rotatably mounted on one end of said stator tube within said air inlet casing, a second disk rotatably mounted on the opposite end of said stator tube within said air outlet casing, sealing means comprising radially extending sector plates hingedly mounted at their inner end on said disk, pivotally mounted levers connected to said sector plates, means connecting the inner end of a lever at one end of the mass with the end of the corresponding lever at the other end of the mass to provide for simultaneous movement of corresponding plates, said connecting means passing through said stator tube, and means to rotate said casings and said disks, whereby said casings and sealing means serve as rotary valves to direct air and gas through said mass in separate streams.

2. A regenerative heat exchanger as defined in claim 1, in which said levers are pivotally mounted on said disks, the outer ends of said levers being rigidly connected to said plates and the inner ends of corresponding levers being connected together.

3. A regenerative heat exchanger as defined in claim 1 and including means for adjusting the distance between corresponding sector plates at opposite ends of said mass.

4. A regenerative heat exchanger as defined in claim 1 in which said connecting means comprises rods and means for counterbalancing said sector plates and levers.

5. A regenerative heat exchanger as defined in claim 4 and including two separate sector plates at both ends of the heat retaining mass, the lever at the air inlet end being pivotally connected at a point between its ends to said inlet casing, means to adjust said point toward and away from said mass, the radially outer end of each lever being pivotally connected to the corresponding sector plate at the inlet end, each lever at the air outlet end being pivotally connected at a point between its ends to said outlet casing, said last named points being movable radially and the radially outer end of said last named lever being pivotally connected to the corresponding sector plate at the air outlet end.

6. A regenerative heat exchanger as defined in claim 5, in which the wall of the gas outlet hood is provided with an access opening to facilitate adjustment of the pivot points of the levers at the air inlet end.

7. A regenerative heat exchanger as defined in claim 1 in which said disks are rotatably mounted on said stator tube by means of a bearing race mounted on each disk, bearing races mounted on said stator tube, antifriction bearings disposed between adjacent races on said disks and stator tube, sealing means between said adjacent races, at least one of the races on said stator tube being threadedly mounted for movement axially of said stator tube, a worm wheel on said one race and a worm engaging said worm wheel to provide for adjustment of said one race axially of said stator tube.

References Cited by the Examiner

UNITED STATES PATENTS

| 1,858,508 | 5/1932 | Kignell et al. | 165—4 |
| 1,939,153 | 12/1933 | Villasuso | 165—5 |
| 2,355,021 | 8/1944 | Waitkus | 165—5 |
| 2,738,958 | 3/1956 | Hodge | 165—9 |
| 2,852,234 | 9/1958 | Muderbach | 165—9 |
| 2,936,160 | 5/1960 | Nilsson et al. | 165—8 |
| 2,951,686 | 9/1960 | Sandmann et al. | 165—9 |
| 3,010,703 | 11/1961 | Bellows et al. | 165—9 |
| 3,061,275 | 10/1962 | Brandt | 165—8 |

ROBERT A. O'LEARY, *Primary Examiner.*

MEYER PERLIN, CHARLES SUKALO, *Examiners.*